United States Patent
Jafari et al.

(10) Patent No.: US 9,753,144 B1
(45) Date of Patent: Sep. 5, 2017

(54) BIAS AND MISALIGNMENT COMPENSATION FOR 6-DOF IMU USING GNSS/INS DATA

(71) Applicant: GM GLOBAL TECHNOLOGY OPERATIONS LLC, Detroit, MI (US)

(72) Inventors: Rouhollah Jafari, Troy, MI (US); Shuqing Zeng, Sterling Heights, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 19 days.

(21) Appl. No.: 15/042,758

(22) Filed: Feb. 12, 2016

(51) Int. Cl.
| | | |
|---|---|---|
| *G05D 1/00* | (2006.01) | |
| *G01S 19/47* | (2010.01) | |
| *G01C 21/16* | (2006.01) | |

(52) U.S. Cl.
CPC .............. *G01S 19/47* (2013.01); *G01C 21/16* (2013.01)

(58) Field of Classification Search
CPC .......... G01C 21/16; G01C 23/00; G05D 1/08; G01S 19/47
USPC .............................................. 701/4, 23, 505
See application file for complete search history.

(56) References Cited

U.S. PATENT DOCUMENTS

| | | | |
|---|---|---|---|
| 6,240,367 B1 * | 5/2001 | Lin ..................... | G01C 21/28 342/357.31 |
| 2010/0097268 A1 | 4/2010 | Roh | |
| 2010/0299003 A1 * | 11/2010 | Hanson ............... | G01C 23/00 701/4 |
| 2011/0172854 A1 | 7/2011 | Barker | |
| 2015/0039154 A1 | 2/2015 | Bhardwaj et al. | |

OTHER PUBLICATIONS

Zeng, Shuqing, et al., U.S. Appl. No. 14/680,894, filed Apr. 7, 2015, entitled, Fail Operational Vehicle Speed Estimation Through Data Fusion of 6-DOF IMU, GPS, and Radar.

* cited by examiner

*Primary Examiner* — Gertrude Arthur Jeanglaude
(74) *Attorney, Agent, or Firm* — John A. Miller; Miller IP Group, PLC

(57) ABSTRACT

A system and method for correcting bias and angle misalignment errors in the angle rate and acceleration outputs from a 6-DOF IMU mounted to a vehicle. The method includes providing velocity and estimation attitude data in an inertial frame from, for example, a GNSS/INS, and determining an ideal acceleration estimation and an ideal rate estimation in a vehicle frame using the velocity and attitude data. The method then determines the IMU bias error and misalignment error using the ideal acceleration and rate estimations and the angle rate and acceleration outputs in an IMU body frame from the IMU.

20 Claims, 2 Drawing Sheets

BIAS AND MISALIGNMENT COMPENSATION FOR 6-DOF IMU USING GNSS/INS DATA

BACKGROUND OF THE INVENTION

Field of the Invention

This invention relates generally to system and method for determining bias and misalignment errors in the outputs from a 6-degree of freedom (DOF) inertial measurement unit (IMU) and, more particularly, to a system and method for determining bias and misalignment errors in the outputs from a 6-DOF IMU on a vehicle using velocity and attitude data from a global navigation satellite system (GNSS) and/or an inertial navigation system (INS), where the method includes determining an ideal acceleration estimation and an ideal angle rate estimation in a vehicle frame using the velocity and attitude data, and determining an IMU bias error and a misalignment error using the ideal acceleration and angular rate estimation and the measured angle rate and acceleration outputs from the IMU.

Discussion of the Related Art

The operation of modern vehicles is becoming more autonomous, i.e., vehicles are able to provide driving control with less driver intervention. Cruise control systems have been on vehicles for a number of years where the vehicle operator can set a particular speed of the vehicle, and the vehicle will maintain that speed without the driver operating the throttle. Adaptive cruise control systems have been recently developed in the art where not only does the system maintain the set speed, but also will automatically slow the vehicle down in the event that a slower moving preceding vehicle is detected using various sensors, such as radar and cameras. Certain modern vehicles also provide autonomous parking where the vehicle will automatically provide the steering control for parking the vehicle. Some vehicle systems providing automatic braking without driver intervention to avoid rear-end collisions. As vehicle systems improve, they will become more autonomous with the goal being a completely autonomously driven vehicle. For example, future vehicles probably will employ autonomous systems for lane changing, passing, turns away from traffic, turns into traffic, etc.

Various active safety control systems, driver assist systems and autonomous driving operations on vehicles, such as systems providing electronic stability control (ECS), adaptive cruise control (ACC), lane keeping (LK), lane changing (LC), etc., require highly robust and precise modules for estimating various vehicle dynamics. Such modules are necessary to provide knowledge of the vehicle position and velocity to control the vehicle.

Active safety control for the systems discussed above, and others, rely on accurate vehicle speed estimation for proper performance. Currently, these types of proposed systems rely on wheel speed sensors and other vehicle kinematic inputs to provide the vehicle speed estimation. However, sometimes sensors and control modules that determine vehicle speed fail or operate improperly, where loss of vehicle speed could be serious. Certain automotive safety requirements, such as ASIL-D, require redundant vehicle speed estimation processes in the event the primary estimation processor fails. For example, for those systems that require active control, the control systems are required to provide accurate speed estimation for five seconds after the failure event so as to give the driver time to take control of the vehicle.

It is known in the art to provide a 6-DOF IMU on a vehicle that provides six rate of change measurements, particularly, angular rate measurements of vehicle roll, pitch and yaw, and acceleration measurements of longitudinal acceleration, lateral acceleration and up/down acceleration. A typical IMU provided on a vehicle will include three gyros that provide the angular rate measurements and three accelerometers that provide the acceleration measurements.

It has been proposed in the art to use the angular rate and acceleration measurements from an IMU on a vehicle to provide signals that can be used for vehicle speed estimation. U.S. patent application Ser. No. 14/680,894, filed Apr. 7, 2015, titled, Fail Operational Vehicle Speed Estimation Through Data Fusion of 6-DOF, IMU, GPS and Radar, discloses a system and method for providing redundant vehicle speed estimation that determines whether one or more primary sensors that provide vehicle speed has failed, and if so, estimates the vehicle speed in a secondary module using a buffered vehicle speed value and inertial measurement signals from an IMU. The method also uses GPS signal data and/or velocity data provided by range sensors from static objects to improve the estimated vehicle speed if they are available.

In the process discussed in the '894 application, the accuracy of the secondary vehicle speed estimation largely depends on the accuracy of the IMU acceleration and angular rate measurements. However, the measurements of acceleration and angular rates provided by the IMU on a vehicle for this purpose usually deviate from the actual acceleration and angular rate values due to several error sources. The two major sources of error for the IMU measurements are accelerometer and gyro bias components and frame misalignment corresponding to mounting the IMU to the vehicle. There is a bias term on each axis, which corresponds to six bias error terms in addition to three misalignment errors. Although it is desirable to perfectly align the IMU with the vehicle frame, there still are mounting errors that even if they are small, could provide significant misalignment errors in the calculations. Further, the bias and misalignment errors can be improved during manufacture of the vehicle by moving the vehicle and identifying the errors. However, such error corrections of bias and misalignment are also difficult to accurately obtain. Further, these error corrections for bias and misalignment often require special vehicle maneuvers during the manufacturing stage of the vehicle, and further bias terms are not fixed and may change in time due to different road, vehicle and environment conditions.

SUMMARY OF THE INVENTION

The present disclosure describes a system and method for correcting bias and angle misalignment errors in the angle rate and acceleration outputs from a 6-DOF IMU mounted to a vehicle. The method includes providing accurate velocity and estimation attitude data in an inertial frame from, for example, a GNSS/INS, and determining an ideal acceleration estimation and an ideal rate estimation in a vehicle frame using the velocity and attitude data. The method then determines the IMU bias error and misalignment error using the ideal acceleration and rate estimations and the angle rate and acceleration outputs in an IMU body frame from the IMU.

Additional features of the present invention will become apparent from the following description and appended claims, taken in conjunction with the accompanying drawings.

DETAILED DESCRIPTION OF THE EMBODIMENTS

The following discussion of the embodiments of the invention directed to a system and method for identifying IMU bias and misalignment errors in a 6-DOF IMU on a vehicle is merely exemplary in nature, and is in no way intended to limit the invention or its applications or uses. For example, the system and method has particular application for secondary vehicle speed estimation. However, as will be appreciated by those skilled in the art, the system and method may have other applications and for other mobile platforms, such as on trains, machines, tractors, boats, recreation vehicles, etc.

Figure 1:
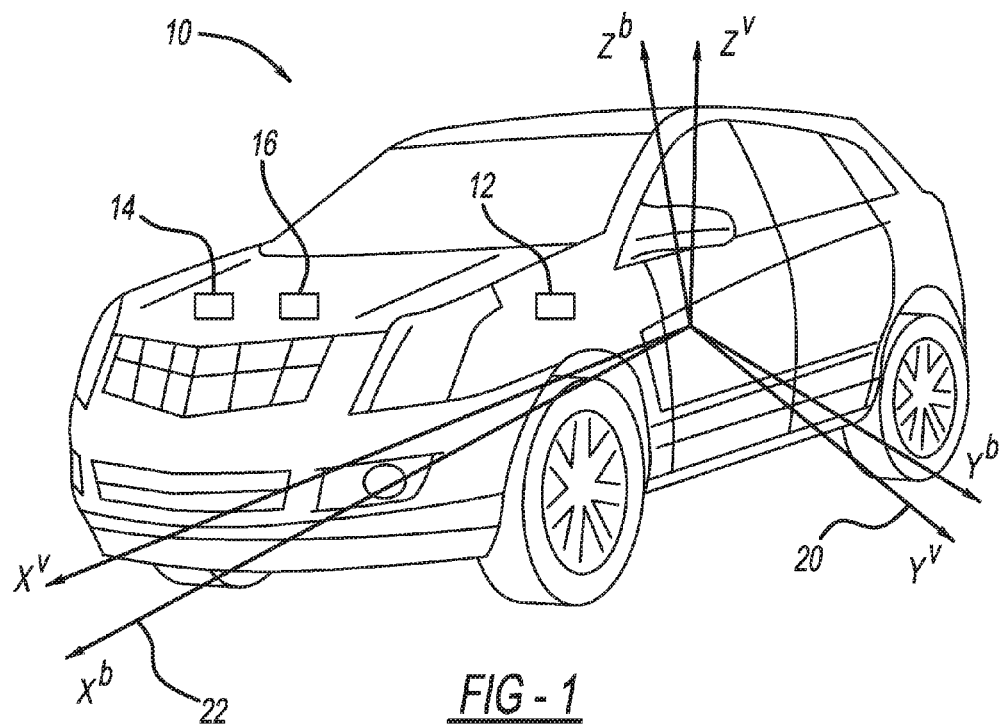
FIG. 1 is an isometric illustration of a vehicle showing a vehicle reference frame and an IMU body frame.

FIG. 1 is an isometric view of a vehicle 10 including a GNSS/INS unit 12 that provides accurate vehicle velocity and attitude data including roll, yaw and pitch angles in a known manner. Further, the vehicle 10 includes sensors 14 intended to represent one or more of wheel speed sensors, steering wheel angle sensors, yaw rate sensors, longitudinal and lateral acceleration sensors, etc. as required by the discussion herein. The vehicle 10 also includes a 6-DOF IMU 16 that provides the acceleration and angular rate measurements as also discussed herein. As mentioned, the IMU 16 is a known device that includes three accelerometers and three gyros. When the vehicle speed measurement data is unavailable, the measurements from the IMU 16 can be employed to provide vehicle speed estimations as discussed, for example, in the '894 application.

The discussion herein will refer to three coordinate frames including an inertial frame (N-frame), which is a fixed reference frame on the ground with the X-axis directed to the east, the Y-axis directed to the north and the Z-axis directed upward. A vehicle frame 20 (V-frame) is a body-fixed frame located at the center of gravity of the vehicle 10 with the X-axis directed forward, the Y-axis directed to the left and the Z-axis directed upward, as shown in FIG. 1. A body frame 22 (b-frame) is a body-fixed frame located at the center of the IMU 16, where the X-Y-Z axes are aligned with the X-Y-Z axes of the accelerometers and gyros in the IMU 16. The IMU errors include the six components of bias for each accelerometer and gyro along the X-Y-Z axes of the body frame 22 and three misalignment angles corresponding to the rotation angles between the body frame 22 and the vehicle frame 20. For each axis of the body frame 22, there are two bias terms, specifically, one for the acceleration and one for the angular rate.

Figure 2:
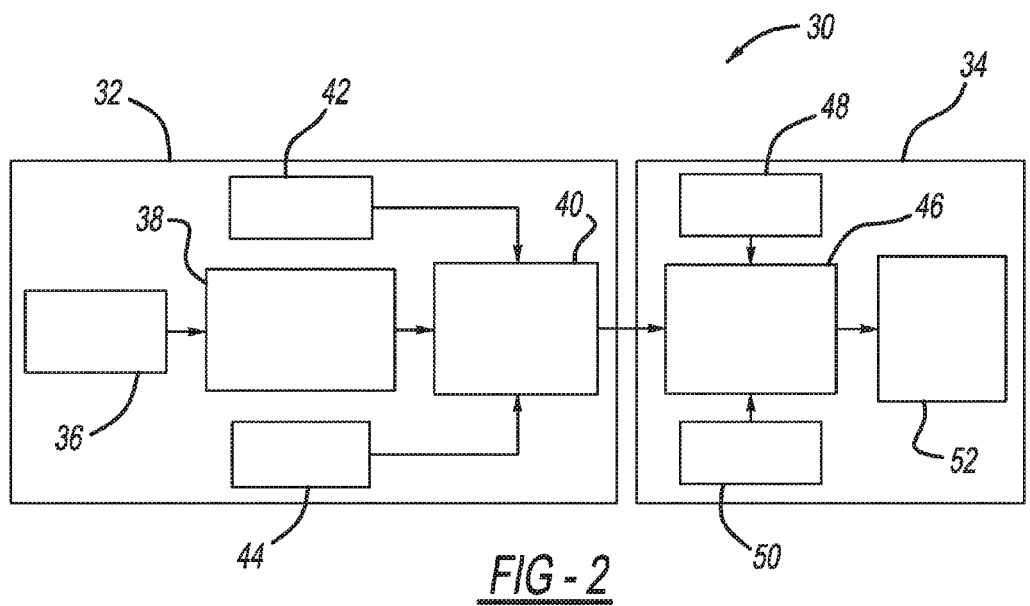
FIG. 2 is a block diagram of an IMU error estimation system.

FIG. 2 is a block diagram of a system 30 that employs an IMU error estimation model to correct for the bias and misalignment errors referred to above. The system 30 includes an IMU error estimation module 32 that estimates the IMU bias and misalignment errors and a state estimation module 34 that corrects the raw measurements from the IMU 16 and utilizes them in the velocity and attitude estimation models. In the error estimation module 32, the accurate vehicle velocity and attitude are provided at box 36 using, for example, the GNSS/INS data. Using the vehicle velocity and attitude data from the box 36, the module 32 determines an ideal acceleration and angular rate in the vehicle frame 20 at box 38.

The discussion below details how the ideal acceleration and angular rate are determined. The following equations define the velocities and angle rates in the vehicle frame 20.

$$\dot{V}^v = -\Omega^v V^v + R_n^v g^n + f^v, \quad (1)$$

$$\dot{R}_n^v = -\Omega^v R_n^v, \quad (2)$$

where $\dot{V}^v$ is the time derivate of the vehicle velocity in the vehicle frame 20, $g^n = [0,0,-9.80665]^t$ is the vector of gravitation acceleration in the inertial frame, $f^v$ is the acceleration vector in the vehicle frame 20, and $R_n^v$ is a transformation matrix from the inertial frame to the vehicle frame 20 corresponding to the Euler angle rotations of roll $\phi$, pitch $\theta$ and yaw $\psi$, where:

$$R_n^v = \begin{bmatrix} \cos\theta\cos\psi & \cos\theta\sin\psi & -\sin\theta \\ \cos\psi\sin\phi\sin\theta - \cos\phi\sin\psi & \sin\phi\sin\theta\sin\psi + \cos\phi\cos\psi & \cos\theta\sin\phi \\ \cos\psi\cos\phi\cos\theta + \sin\phi\sin\psi & \cos\phi\sin\theta\sin\psi - \sin\phi\cos\psi & \cos\theta\cos\phi \end{bmatrix}, \quad (3)$$

and where $\Omega^v = [(\omega^v \times)]$ is the skew-symmetric matrix of the IMU's vehicle angular rates $\omega^v$ as:

$$\Omega^v = \begin{bmatrix} 0 & -\omega_\psi & \omega_\theta \\ \omega_\psi & 0 & -\omega_\phi \\ -\omega_\theta & \omega_\phi & 0 \end{bmatrix}. \quad (4)$$

Assuming that the vehicle velocity $V^v$ and the roll angle $\phi$, pitch angle $\theta$ and yaw angle $\psi$ are known from the GNSS/INS data, by using equation (1) the ideal IMU acceleration vector $f^v$ and the angular rate measurements $\Omega^v$ in the vehicle frame 20 can be found as:

$$\Omega^v = -\dot{R}_n^v (R_n^v)^T, \quad (5)$$

$$f^v = \dot{V}^v + \Omega^v V^v - R_n^v g^n, \quad (6)$$

where $\dot{V}^v$ is obtained using the numerical derivatives of the velocity data and $\dot{R}_n^v$ is obtained using equation (3) as:

$$\dot{R}_n^v = \frac{\partial R_n^v}{\phi}\dot{\phi} + \frac{\partial R_n^v}{\theta}\dot{\theta} + \frac{\partial R_n^v}{\psi}\dot{\psi}, \quad (7)$$

where $\dot{\phi}$, $\dot{\theta}$ and $\dot{\psi}$ are calculated numerically.

The ideal IMU acceleration vector $f^v$ and the ideal angular rate $\Omega^v$ from the box 38 are sent to an IMU bias and misalignment estimation box 40 that compares the ideal acceleration vector $f^v$ and the ideal angular rate $\Omega^v$ estimation values to the angle rates $\omega^b$ in the body frame 22 from the gyros in the IMU 16 provided at box 42 and the acceleration values $f^b$ in the body frame 22 from the accelerometers in the IMU 16 provided at box 44 to calculate the bias and misalignment estimation errors. As long as the GNSS/INS date provides accurate information to determine the vehicle velocity and attitude at the box 36, then the bias and misalignment errors for each accelerometer on the X-Y-Z axes of the body frame 22 and the three misalignment angle errors can be accurately obtained at the box 40.

In order to calculate the bias and misalignment estimation errors, a relationship between the ideal and the actual measurements is obtained. The IMU measurements in equation (5) are ideal measurements in the sense that they do not include any IMU errors. Considering bias and misalignment as two significant errors, the ideal values and the actual IMU measurements are related as:

$$f^b = R_v^b f^v + f_{bias}, \quad (8)$$

$$\omega^b = R_v^b \omega^v + \omega_{bias}, \quad (9)$$

where $f^b$ and $\omega^b$ are the actual IMU measurements in the body frame 22, $f_{bias}$ and $\omega_{bias}$ are the bias vectors of the accelerometers and gyros, respectively, and $R_v^b$ is the transformation matrix from the vehicle frame 20 to the body frame 22 corresponding to the IMU misalignment angles as:

$$R_v^b = \begin{bmatrix} \cos\beta\cos\gamma & \cos\theta\sin\gamma & -\sin\beta \\ \cos\gamma\sin\alpha\sin\beta - \cos\alpha\sin\gamma & \sin\gamma\sin\alpha\sin\beta + \cos\alpha\cos\gamma & \cos\beta\sin\alpha \\ \cos\gamma\cos\alpha\sin\beta + \sin\alpha\sin\gamma & \sin\gamma\cos\alpha\sin\beta - \sin\alpha\cos\gamma & \cos\beta\cos\alpha \end{bmatrix}, \quad (10)$$

where $\alpha$, $\beta$ and $\gamma$ are the misalignment Euler angles about the X, Y and Z axes, respectively.

Equations (8) and (9) include six equations with nine unknowns to be found. To find a unique solution to the equations, three equations related to the acceleration measurements from a different time instant are necessary.

In the box 40, the three misalignment angles $\alpha$, $\beta$ and $\gamma$ are first found using the ideal acceleration measurements at two different time instants in the following two cases. The first case varies the longitudinal acceleration with constant lateral and vertical accelerations. In this case, the following conditions hold for the ideal acceleration measurements of the IMU 16 at times $t_1$ and $t_2$ as:

$$f_x^v(t_1) \neq f_x^v(t_2), \quad (11)$$

$$f_y^v(t_1) = f_y^v(t_2), \quad (12)$$

$$f_z^v(t_1) = f_z^v(t_2). \quad (13)$$

Assuming that the bias terms remain constant at times $t_1$ and $t_2$ and using equations (8)-(13), the difference between the actual IMU measurements at times $t_1$ and $t_2$ is found as:

$$\begin{cases} \Delta f_x^b = \cos\beta\cos\Delta f_x^v \\ \Delta f_y^b = (\cos\gamma\sin\alpha\sin\beta - \cos\alpha\sin\gamma)\Delta f_x^v \\ \Delta f_z^b = (\cos\gamma\cos\alpha\sin\beta + \sin\alpha\sin\gamma)\Delta f_x^v \end{cases} \quad (14)$$

where $\Delta f = f(t_2) - f(t_1)$, and where the constant lateral and vertical acceleration terms in the vehicle frame 20 as well as the bias terms are canceled out in the subtraction.

Linearizing equation (14) in the neighborhood of $(\alpha, \beta, \gamma) = (0,0,0,)$ yields:

$$\begin{cases} \Delta f_x^b = \Delta f_x^v \\ \Delta f_y^b = -\gamma \Delta f_x^v \\ \Delta f_z^b = \beta \Delta f_x^v \end{cases} \quad (15)$$

which results in:

$$\beta = \frac{\Delta f_z^b}{\Delta f_x^v}, \quad (16)$$

$$\gamma = -\frac{\Delta f_y^b}{\Delta f_x^v}. \quad (17)$$

If $\beta \neq 0$ or $\gamma \neq 0$, then the misalignment angle $\alpha$ is found by substituting equations (16) and (17) into equation (14) as:

$$\alpha = \sin^{-1}\left(\frac{c_1 \Delta f_y^b + c_2 \Delta f_z^b}{c_1^2 + c_2^2}\right), \quad (18)$$

where:

$$c_1 = \sin\beta\cos\gamma \Delta f_x^v, \quad (19)$$

$$c_2 = \sin\gamma f_x^v. \quad (20)$$

The second case varies the longitudinal and vertical accelerations with a constant lateral acceleration. In this case, the following conditions are provided.

$$f_x^v(t_1) \neq f_x^v(t_2), \quad (21)$$

$$f_y^v(t_1) = f_y^v(t_2), \quad (22)$$

$$f_z^v(t_1) \neq f_z^v(t_2). \quad (23)$$

Assuming that the bias terms remain constant at times $t_1$ and $t_2$ and using equations (8), (9), (21), (22) and (23), the difference between the actual IMU measurements at times $t_1$ and $t_2$ is found as:

$$\begin{cases} \Delta f_x^b = \cos\beta\cos\gamma\Delta f_x^v - \sin\beta f_z^b \\ \Delta f_y^b = (\cos\gamma\sin\alpha\sin\beta - \cos\alpha\sin\gamma)\Delta f_x^v + \sin\alpha\cos\beta f_z^v \\ \Delta f_z^b = (\cos\gamma\cos\alpha\sin\beta - \sin\alpha\sin\gamma)\Delta f_x^v + \cos\alpha\cos\beta f_z^v \end{cases} \quad (24)$$

where the constant lateral acceleration terms and the bias terms in the vehicle frame 20 are cancelled out in the subtraction.

Linearizing equation (24) in the neighborhood of $(\alpha, \beta, \gamma) = (0,0,0,)$ yields:

$$\begin{cases} \Delta f_x^b = \Delta f_x^v - \beta \Delta f_z^v \\ \Delta f_y^b = -\gamma \Delta f_x^v + \alpha \Delta f_z^v \\ \Delta f_z^b = \beta \Delta f_x^v + \Delta f_z^v \end{cases} \quad (25)$$

The misalignment angle is found from equation (25) as:

$$\beta = \frac{\Delta f_z^b - \Delta f_z^v}{\Delta f_x^v}. \quad (26)$$

If an estimation of the misalignment angle $\gamma$ is available from previous times, then:

$$\alpha = \frac{\Delta f_y^b - \Delta f_x^v}{\Delta f_z^v}. \quad (27)$$

For implementing the misalignment estimation algorithm, the ideal IMU measurements in equations (5) and (6) are buffered in the module 32 for a short period of time (e.g., 1 second). The time $t_2$ is put equal to the current time, and time $t_1$ is found by searching the buffered data, which satisfy the conditions in the first case or the second case. Since the misalignment angles are constant, they are updated as the average of the current and previous values at each time instant.

Once the misalignment angles α, β and γ are calculated, the bias components for the accelerometers and gyros can be obtained using equations (8), (9) and (10) as:

$$f_{bias} = f^b - R_v^b f^v, \quad (28)$$

$$\omega_{bias} = \omega^b - R_v^b \omega^v. \quad (29)$$

Figure 3:
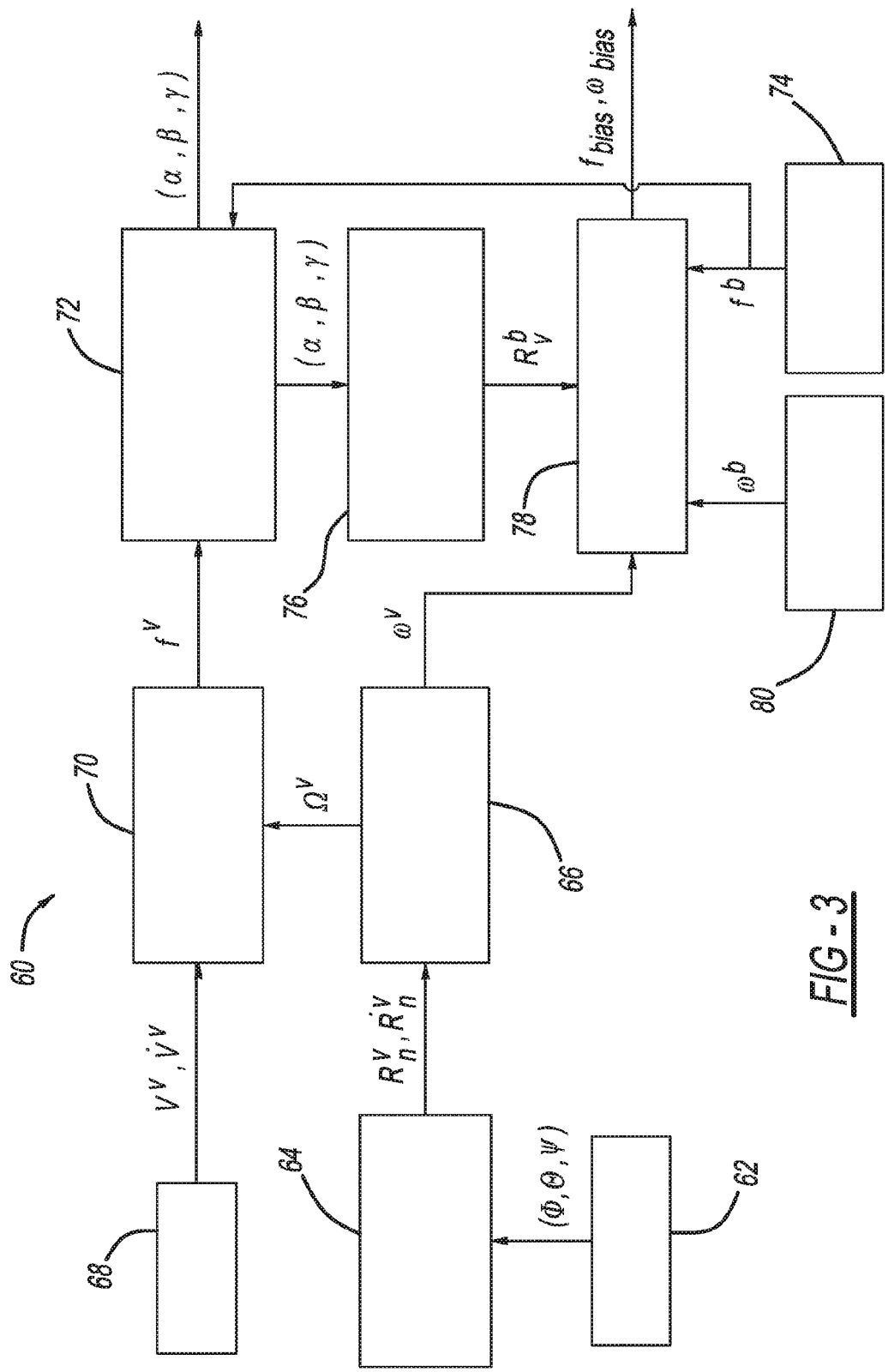
FIG. 3 is a flow diagram showing a process for providing IMU error estimations.

FIG. 3 is a flowchart diagram 60 showing a process for providing the IMU error estimation calculations in the boxes 38 and 40 as discussed above. Vehicle attitude measurements of roll ϕ, pitch θ and yaw ψ are provided at box 62 from the GNSS/INS data to box 64 that transforms the vehicle attitude measurements from the inertial frame to the vehicle frame 20 to obtain the transformation matrixes $R_n^v$ and $\dot{R}_n^v$ as provided by equations (2) and (3). The transformation matrixes $R_n^v$ and $\dot{R}_n^v$ are then sent to box 66 to provide compensated rates in the vehicle frame 20 including the angular rates $\omega^v$ and the skew-symmetric matrix $\Omega^v$ provided by equation (5). The vehicle velocity and acceleration values $V^v$ and $\dot{V}^v$ from the GNSS/INS data are provided at box 68 and are compensated for acceleration in the vehicle frame 20 at box 70 using the skew-symmetric matrix $\Omega^v$ provided by equation (5) from the box 66 to obtain the measured acceleration vector $f^v$ in the vehicle frame 20 provided by equation (6). The algorithm uses the vector $f^v$ from the box 70 and the IMU acceleration measurement values $f^b$ from box 74 to calculate the misalignment angles α, β and γ using either the first case through equations (16), (17) and (18) or the second case through equations (26) and (27). The algorithm generates the transformation matrix $R_v^b$ for transformation from the vehicle frame 20 to the body frame 22 using equation (10) at box 76. The transformation matrix $R_v^b$ is then provided to box 78 along with the angle rates $\omega^b$ in the body frame 22 from the IMU 16 at box 80 and the acceleration rates $f^b$ in the body frame 22 from the box 74 to generate the bias components $f_{bias}$ and $\omega_{bias}$ using equations (28) and (29), where the results obtained from equations (16), (17) and (18) or equations (26) and (27), and equations (28) and (29) give the nine values.

The nine values identifying the bias and misalignment errors from the box 40 are provided to the module 34 so that if the GNSS/INS data is not available at any particular point in time, then the previous calculated errors can be used to identify the vehicle velocity and attitude in case those values are needed if the vehicle velocity sensors fail. Therefore, if the IMU data is needed to estimate the vehicle velocity as in the '894 application, those values are adjusted for the errors prior to being used for those calculations. The errors from the box 40 are applied to an IMU bias and misalignment compensation box 46 in the module 34 along with IMU angle rates $\omega^b$ at box 48 and the IMU acceleration values $f^b$ at box 50 to be corrected as follows.

$$f^v = (R_v^b)^T (f^b - f_{bias}), \quad (30)$$

$$\omega^v = (R_v^b)^T (\omega^b - \omega_{bias}). \quad (31)$$

Once the IMU angle rates and acceleration values are corrected at the box 46, those corrected values can be used to determine the vehicle velocity and attitude at box 52 as described, for example, in the '894 application.

As will be well understood by those skilled in the art, the several and various steps and processes discussed herein to describe the invention may be referring to operations performed by a computer, a processor or other electronic calculating device that manipulate and/or transform data using electrical phenomenon. Those computers and electronic devices may employ various volatile and/or non-volatile memories including non-transitory computer-readable medium with an executable program stored thereon including various code or executable instructions able to be performed by the computer or processor, where the memory and/or computer-readable medium may include all forms and types of memory and other computer-readable media.

The foregoing discussion discloses and describes merely exemplary embodiments of the present invention. One skilled in the art will readily recognize from such discussion and from the accompanying drawings and claims that various changes, modifications and variations can be made therein without departing from the spirit and scope of the invention as defined in the following claims.

What is claimed is:

1. A method for correcting bias and angle misalignment errors in angle rate and acceleration outputs from a six-degree of freedom (DOF) inertial measurement unit (IMU), said IMU being mounted on a platform, said method comprising:
   obtaining velocity and estimation attitude data in an inertial frame;
   determining an acceleration estimation and a rate estimation in a platform frame using the velocity and attitude data; and
   determining an IMU bias error and a misalignment error using the acceleration and rate estimations and the angle rate and acceleration outputs from the IMU.

2. The method according to claim 1 wherein obtaining velocity and attitude data includes obtaining velocity and attitude data from a global navigation satellite system (GNSS) and/or an inertial navigation system (INS).

3. The method according to claim 1 wherein determining an acceleration estimation and a rate estimation includes transforming velocity, roll angle, pitch angle and yaw angle of the platform in the inertial frame to the platform frame.

4. The method according to claim 3 wherein transforming velocity and roll, pitch and yaw includes using the equations:

$$\dot{V}^v = -\Omega^v V^v + R_n^v g^n + f^v$$

$$\dot{R}_n^v = -\Omega^v R_n^v$$

where $\dot{V}^v$ is a time derivate of the velocity in the platform frame, $g^n = [0,0, -9.80665]^t$ is a vector of gravitation acceleration in the inertial frame, $f^v$ is an acceleration vector in the platform frame, and $R_n^v$ is a transformation matrix from the inertial frame to the platform frame corresponding to angle rotations of roll ϕ, pitch θ and yaw ψ, where:

$$R_n^v = \begin{bmatrix} \cos\theta\cos\psi & \cos\theta\sin\psi & -\sin\theta \\ \cos\psi\sin\phi\sin\theta - \cos\phi\sin\psi & \sin\phi\sin\theta\sin\psi + \cos\phi\cos\psi & \cos\theta\sin\phi \\ \cos\psi\cos\phi\cos\theta + \sin\phi\sin\psi & \cos\phi\sin\theta\sin\psi - \sin\theta\cos\psi & \cos\theta\cos\phi \end{bmatrix}$$

and where $\Omega^v = [\omega^v \times]$ is a skew-symmetric matrix of the IMU angular rate outputs as:

$$\Omega^v = \begin{bmatrix} 0 & -\omega_\psi & \omega_\theta \\ \omega_\psi & 0 & -\omega_\phi \\ -\omega_\theta & \omega_\phi & 0 \end{bmatrix}.$$

$$\Omega b = -\dot{R}_n^v (R_n^v)^T$$

$$f^v = \dot{V}^v + \Omega^v V^v - R_n^v g^n$$

where $\Omega$ is the angular rate, $\dot{V}^v$ is obtained using numerical derivatives of the velocity data, and $\dot{R}_n^v$ is obtained as:

$$\dot{R}_n^v = \frac{\partial R_n^v}{\phi}\dot{\phi} + \frac{\partial R_n^v}{\theta}\dot{\theta} + \frac{\partial R_n^v}{\psi}\dot{\psi}$$

where $\dot{\phi}$, $\dot{\theta}$ and $\dot{\psi}$ are calculated numerically.

5. The method according to claim 1 wherein determining an IMU bias error and a misalignment error includes comparing the acceleration estimation and the ideal rate estimation to the angle rate and acceleration outputs from the IMU.

6. The method according to claim 5 wherein comparing the acceleration estimation and the rate estimation includes transforming the acceleration and angular rate estimations from the platform frame to an IMU body frame.

7. The method according to claim 6 wherein determining the IMU bias error and misalignment error includes identifying three misalignment angles using the acceleration estimations at two different sample time.

8. The method according to claim 7 wherein determining the misalignment angles includes varying a longitudinal acceleration of the platform with a constant lateral and vertical acceleration.

9. The method according to claim 7 wherein determining the misalignment angles includes varying the longitudinal and vertical accelerations of the platform with a constant lateral acceleration.

10. The method according to claim 7 wherein determining the IMU bias error and misalignment error includes using equations:

$$f_{bias} = f^b - R_v^b f^v,$$

$$\omega_{bias} = \omega^b - R_v^b \omega^v.$$

11. The method according to claim 1 further comprising using the IMU bias error and misalignment error to determine platform velocity in the event that providing velocity and estimation attitude data is unavailable.

12. The method according to claim 1 wherein the platform is a vehicle and the IMU is mounted to a vehicle structure.

13. A method for correcting bias and angle misalignment errors in angle rate and acceleration outputs from a six-degree of freedom (DOF) inertial measurement unit (IMU) mounted on a vehicle, said method comprising:

providing velocity and estimation attitude data in an inertial frame from a global navigation satellite system (GNSS) and/or an inertial navigation system (INS);

determining an acceleration estimation and a rate estimation in a vehicle frame using the velocity and attitude data that includes transforming velocity, roll angle, pitch angle and yaw angle of the vehicle in the inertial frame to the vehicle frame; and determining an IMU bias error and a misalignment error using the acceleration and rate estimations and the angle rate and acceleration outputs from the IMU that includes comparing the acceleration estimation and the rate estimation to the angle rate and acceleration outputs from the IMU and transforming the acceleration and angular rate estimations from the vehicle frame to an IMU body frame.

14. The method according to claim 13 wherein determining the IMU bias error and misalignment error includes identifying three misalignment angles using the ideal acceleration estimations at two different sample time.

15. The method according to claim 14 wherein determining the misalignment angles includes varying a longitudinal acceleration of the vehicle with a constant lateral and vertical acceleration.

16. The method according to claim 14 wherein determining the misalignment angles includes varying the longitudinal and vertical accelerations of the vehicle with a constant lateral acceleration.

17. The method according to claim 14 wherein determining the IMU bias error and misalignment error includes using equations:

$$f_{bias} = f^b - R_v^b f^v,$$

$$\omega_{bias} = \omega^b - R_v^b \omega^v,$$

where $f_{bias}$ is the misalignment error, $f^b$ is acceleration in the body frame, $f^v$ is acceleration in the vehicle frame, $\omega_{bias}$ is the bias error, $\omega^b$ is angular rate in the body frame, $\omega^v$ is angular rate in the vehicle frame, and $R_v^b$ is a transformational matrix between the vehicle frame and the body frame.

18. The method according to claim 13 further comprising using the IMU bias error and misalignment error to determine vehicle velocity in the event that providing velocity and estimation attitude data is unavailable.

19. A system for correcting bias and angle misalignment errors in angle rate and acceleration outputs from a six-degree of freedom (DOF) inertial measurement unit (IMU), said IMU being mounted on a platform, said system comprising:

means for providing velocity and estimation attitude data in an inertial frame;

means for determining an ideal acceleration estimation and a rate estimation in a platform frame using the velocity and attitude data; and means for determining an IMU bias error and a misalignment error using the acceleration and rate estimations and the angle rate and acceleration outputs from the IMU.

20. The system according to claim 19 wherein the means for providing velocity and attitude data provides the velocity and attitude data from a global navigation satellite system (GNSS) and/or an inertial navigation system (INS).

* * * * *